Aug. 15, 1961    R. M. SNOOK    2,996,091
REVERSIBLE BLADE SAW HANDLE
Filed March 13, 1958    3 Sheets-Sheet 1
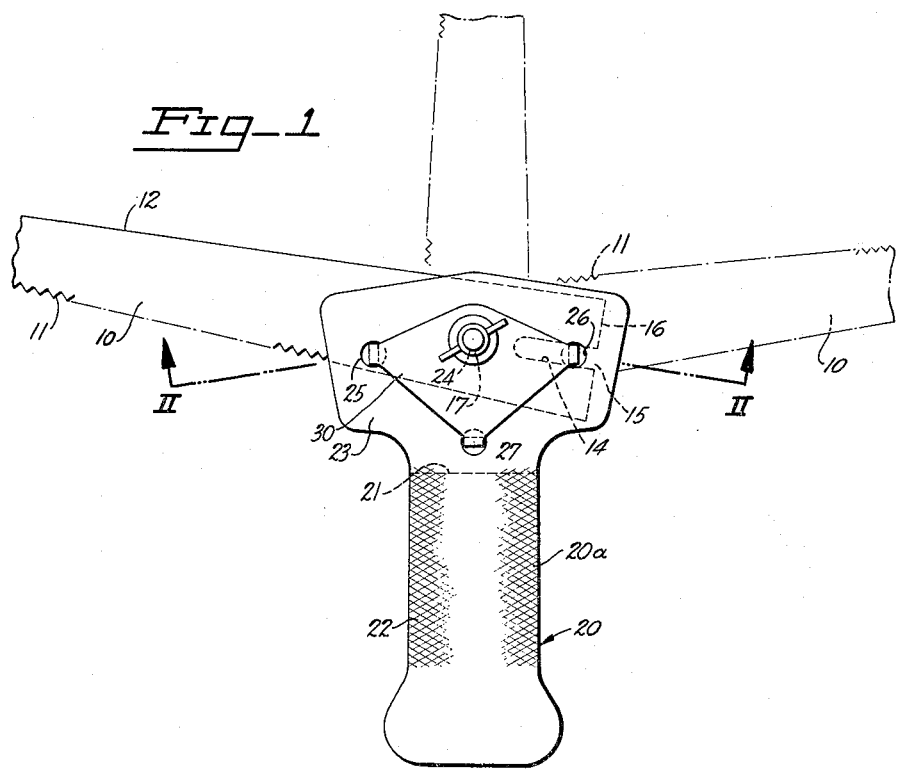
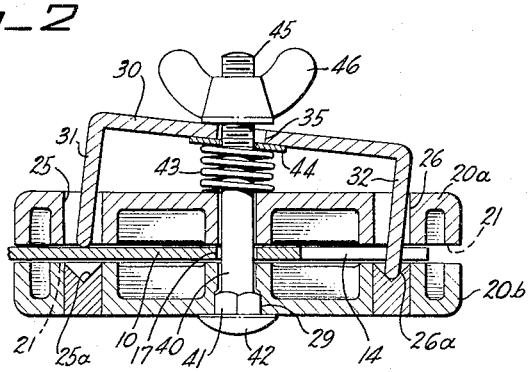
INVENTOR.
ROGER M. SNOOK
BY
Henry Gippard Hardy
Attorney.

INVENTOR.
ROGER M. SNOOK
BY Henry Gifford Hardy
Attorney.

Aug. 15, 1961    R. M. SNOOK    2,996,091
REVERSIBLE BLADE SAW HANDLE
Filed March 13, 1958    3 Sheets-Sheet 3
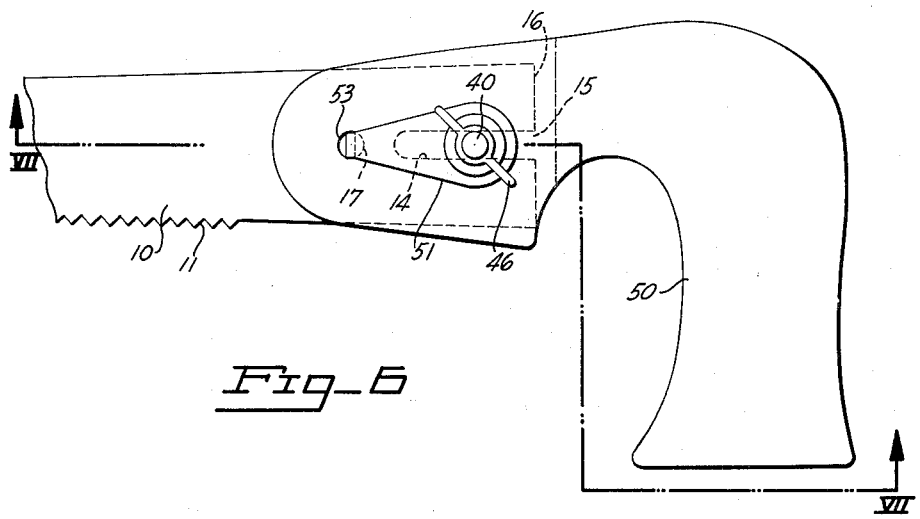
Fig_6
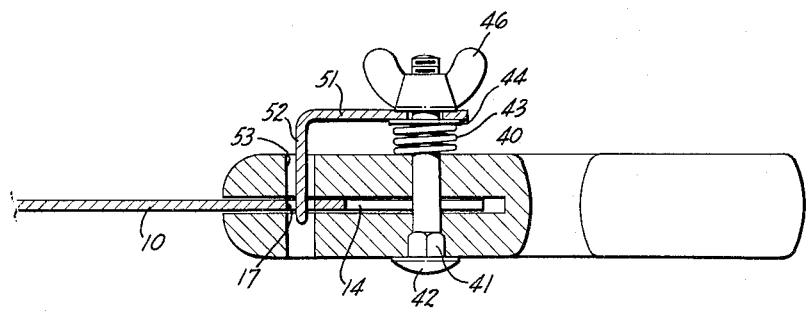
Fig_7
INVENTOR.
ROGER M. SNOOK
BY Henry Gifford Hardy.
Attorney.

United States Patent Office 2,996,091
Patented Aug. 15, 1961

2,996,091
REVERSIBLE BLADE SAW HANDLE
Roger M. Snook, Daly City, Calif. (177 Romney Drive, Serra Highlands, South San Francisco, Calif.)
Filed Mar. 13, 1958, Ser. No. 721,234
4 Claims. (Cl. 145—31)

This invention relates to a saw handle which permits the reversal of the cutting blade and particularly relates to hand saws of the nature of coping saws or keyhole saws.

It is a well-known fact that most hand saw handles of the above-mentioned types provide a grip which is substantially at right angles to the line of the teeth on the blade. Electricians, carpenters, plumbers and other types of journeymen are continually confronted with the difficulty of sawing flush to the floor, ceiling or wall with a keyhole saw or coping saw. This is specially the case when it is required to saw through a partition or a wall that has another wall, ceiling or floor adjacent and at right angles to the cutting line. The butt of the saw handle prevents the journeyman from cutting a level flush line and he is therefore required to cut at various angles to approximate the desired cut.

In order to make a level or flush cut with the hand saws presently on the market, it is necessary to reverse the blade of the saw so that its teeth point upward toward the top of the handle, rather than downward toward the butt of the handle. This will enable the cutting line to be unobstructed. However, the only way by which this reversal of the saw blade can be effected is through the tedious process of dismantling and reassembling the saw for each such operation. It is readily observed that such a task is not only irksome but time-consuming.

Accordingly, it is an object of the present invention to provide a grip or saw handle which removably retains the blade in such a manner that the saw blade may be quickly and easily adjusted and held firmly in any one of six adjusted positions.

Another object of the present invention is to provide a hand saw in which the blade may be reversed or pivoted in three positions around the bolt hole of the saw blade, without removing the same from the saw handle.

Further objects are to provide a construction of maximum simplicity, economy and ease of manufacture, also such further objects, advantages and capabilities as will fully appear and as are inherently possessed by the device and the invention described herein.

The invention further resides in the combination, construction and arrangement of parts illustrated in the accompanying drawings, in which a preferred and modified form is shown, and it is to be understood that the same are merely illustrative of the invention and that the invention is capable of modification and change, and comprehends other details of construction without departing from the spirit thereof or the scope of the appended claims.

Referring to the drawings:

FIGURE 1 is a side elevational view of the hand saw of the present invention showing the three pivoted positions of the saw blade;

FIGURE 2 is an enlarged section taken on the line I—II of FIGURE 1;

FIGURE 6 shows a modification of the saw blade mounting in the conventional handle where the change of the blade is restricted to two positions; and FIGURE 7 is a bottom elevational view partly in section taken on the line VII—VII of FIGURE 6.

Figure 3:
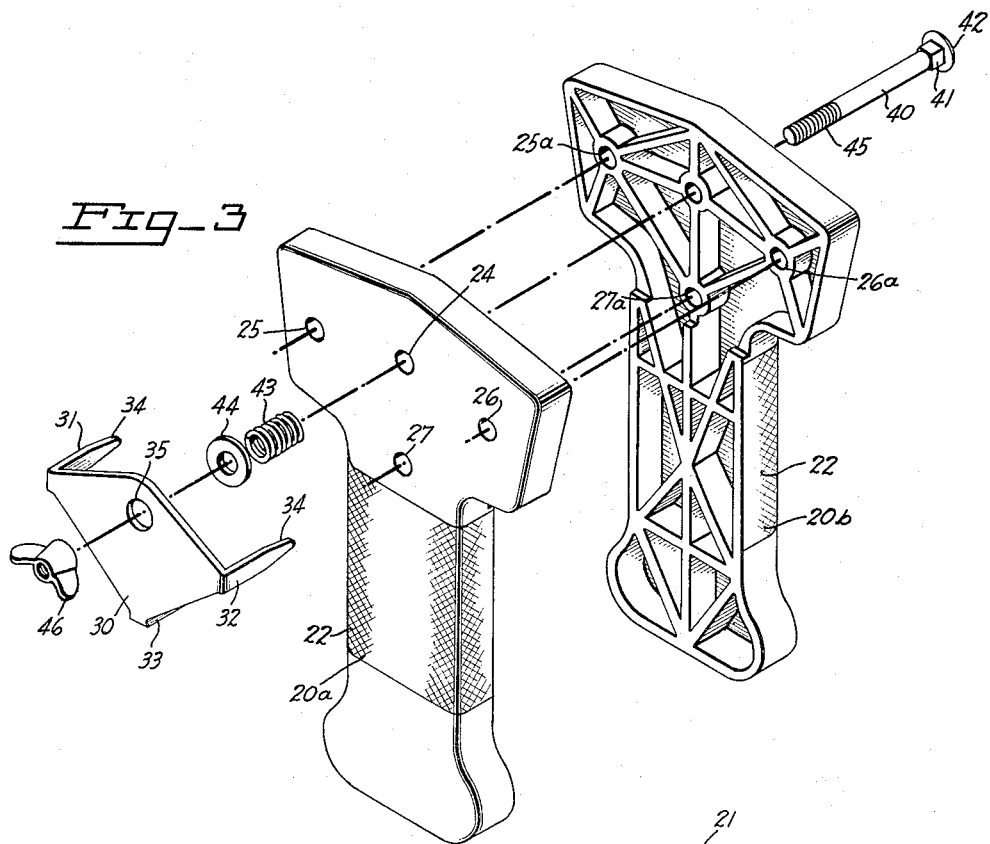
FIGURE 3 is an exploded perspective view of the construction and assembly of the handle and blade holding means.

Referring again to the drawings in which like numerals are used to indicate similar parts in the several views, and with particular reference to FIGURE 1, there is shown therein the representation of the inner portion of a saw blade 10 which is characteristic of all keyhole and coping saws made for hand tools. The construction of the saw 10 is a single thickness of metal in the form of a long taper, with teeth 11 along one side and a plain back 12 on the opposite side. The saw blade 10 is made with a longitudinal end slot 14 having an opening 15 substantially midway of the rear edge 16. A short distance inwardly of the slot 14 and aligned therewith is a hole 17. Since the present invention is designed to use the standard saw blade 10, no change in the form of the blade 10, either with respect to the hole 17 or the slot 14, is contemplated.

In the preferred form the handle shown in FIGURES 1 to 4, identified by numeral 20, is made of two identical halves 20a and 20b and may be molded or cast from any suitable plastic. The symmetrical handle portions 20a and 20b are so recessed at the upper portion of their inner face as to provide a saw blade slot 21 which is of suitable width to accommodate the thickness of the saw blade 10. The waist or grip portion of the handle 20 may be knurled as at 22 to provide good gripping contact. The upper or head portion of the handle 20, which is numbered 23 and through which the slot 21 completely passes, has a transverse hole or opening 24 which passes completely through both side portions and the slot 21. The near side has three additional holes 25, 26 and 27. Holes 25 and 26 pass completely through the upper portion of handle member 20a and terminate internally of the inner face of the opposite head portion 20b in the form of conical wells 25a and 26a. Similarly, the hole 27, which is vertically aligned with the hole 24, passes completely through the head portion of the handle member 20a and terminates in the internal face of the head portion of 20b in the conical well 27a.

A stud plate 30 is provided and this plate is preferably of metal, having an irregular diamond shape, with three perpendicular studs 31, 32 and 33. These studs are of sufficient length to simultaneously more than penetrate the handle holes 25, 26 and 27, respectively, with which they register, and still rest in the well portions 25a, 26a and 27a. The studs 31, 32 and 33 are of sufficient width to pass through the respective holes without binding, but are tapered at their outer ends as at 34 so that when they are in the proper position any one of them may pass through the slot 15 of the saw blade and wedge therein with the tip thereof projecting into its respective wells 25a, 26a, or 27a, as the case may be. The stud plate is also provided with an aperture 35 which is in registry with the hole 24, passing completely through the upper portion of the handle.

Figure 4:
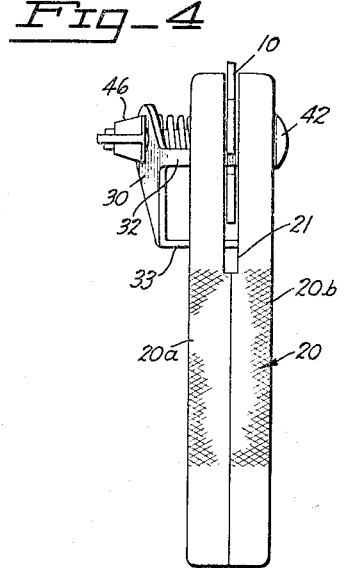
FIGURE 4 is an end elevational view of the hand saw shown in FIGURE 1 and looking in the direction of the arrows.

The manner of assembling the tool is as follows: The saw blade 10 is fitted into the slot 21, in the normal position with its teeth downwardly, as shown in FIGURE 1, and with the hole 17 therein in registry with the hole 24 of the handle. A carriage bolt 40 having a squared portion of the shank 41 and a slightly domed round head 42 is inserted through the hole 24 from the right-hand side of the handle, as shown in FIGURE 3. The right-hand side of the handle is preferably recessed as at 29 in order to accommodate the squared shank portion 41 and prevent the free turning of the bolt. The carriage bolt passes through the hole 24, through the hole 17 in the saw blade and out the left-hand side of the handle, projecting a little distance. A spring 43 and a washer 44 are placed on the projecting end of the bolt under the surface of the stud plate 30 as the stud plate is placed on the shank of the carriage bolt 40, so that the threaded portion 45 thereof projects outwardly beyond the hole 35 in the stud plate. In placing the stud plate on the carriage bolt, the studs 31, 32 and 33 are inserted at the same time into their respective receiving holes 25, 26 and 27. A wing nut 46 is threaded onto the carriage bolt 40. As the wing nut 46 is turned up or tightened, it is obvious that the stud 31 in passing through the hole 25 is prevented from going further by contact with the blade 10 as shown in FIGURE 2. However, the stud 32 passes through the slot 14 of the blade and because of the taper 34 wedges itself within the width of the blade slot to hold the blade firm against wobble. This causes a tilt in the stud plate 30, as shown in FIGURES 2 and 4. It should be stated that the length of the several studs and the tilt of the stud plate, as shown in the various views are exaggerated to indicate the nature of the adjustment. In the usual position shown in FIGURE 1, with the blade projecting to the left, with the teeth downwardly, the normal position of the keyhole or coping saw is attained. In this position the stud 33 forms no other function than steadying the entire assembly.

There are times when it is necessary to saw through an opening which will admit only a hand, and in such a situation the butt of the normal handle would prevent the use of the tool. However, the present hand saw can position the saw blade straight out like a sword, which leaves the tool in such a position that no handle butt will obstruct the operation. All that it is necessary to do is to release the wing nut 46 with the left hand, permitting the spring 43 to move the stud plate 30 outwardly to disengage the stud 32 from the saw slot 14. The saw blade may now be pivoted around the carriage bolt 40 as the pivot so that the stud 33 engages the slot 14 in the saw. Then by tightening the wing nut 46, the stud 33 is wedged by means of its tapered portion 34 in the slot of the saw blade and the same is ready for use in this position. In the same manner, the saw blade may be pivoted around to the position shown at the right of FIGURE 1, where the teeth 11 of the saw 10 project upwardly. Here again, the movement is accomplished merely by pivoting of the saw blade without disassembling any of the parts. Thus, these three positions can be attained quickly and at the moment any one of them is desired. Likewise, and in the same manner, the saw blade can be restored to the normal position with the same facility. Accordingly, three pivotal positions are provided in the one assembly.

There are, however, occasions which require left-handed use, where the operating mechanism, i.e., the spring 43, the washer 44, the stud plate 30 and the wing nut 46, are to be placed on the right-hand side instead of the left-hand side as shown in FIGURES 1, 3 and 4. When these are assembled on the right-hand side, the handle is reversed in position to that shown in FIGURE 3 and the normal position then would be the saw blade with the teeth downwardly as shown in the left-hand position of FIGURE 1.

It will be appreciated that when the saw is inserted in the normal way for left-hand operation, it may be pivoted to any one of the three positions of left, vertical and right, with the mechanism for operating the pivoting adjustment on the right-hand side of the tool instead of the left. Thus, with this one tool, six different positions can be obtained, which positions will successfully negotiate every condition which the user is likely to encounter in any kind of a situation.

Figure 5:
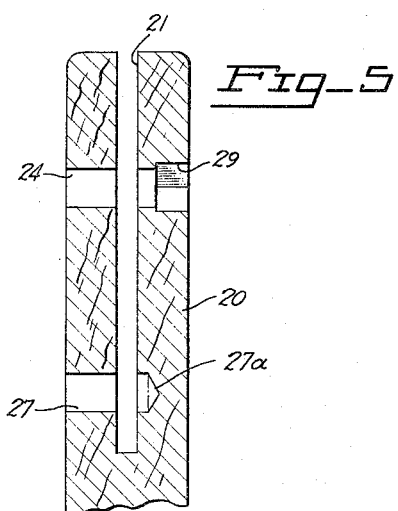
FIGURE 5 is an enlarged fragmentary vertical section of the handle portion where the handle is made in a single piece of wood or other suitable material.

It is clearly apparent that the handle 20 can be made of a single piece of wood or other material, as shown in FIGURE 5, as well as two identical halves as shown in FIGURES 1, 2, 3 and 4.

Referring now to FIGURES 6 and 7, there is shown the normal coping saw or keyhole saw adapted to make two instantaneous adjustments, in the manner of this invention.

The saw blade 10 is the standard saw blade and the usual fastenings for the blade in the handle 50 have been removed. In this instance the carriage bolt 40 with its squared shank portion 41 embedded in the handle 50 passes through the slot 14 of the saw blade 10 and out the other side through the spring 43, the washer 44, and a smaller stud plate 51. The assembly, of course, is held in position by the wing nut 46. The stud plate 51 of this modification has a single stud 52 which projects into and through the hole 53 of the handle 50 and through the hole 17 of the saw blade 10. When the tool is assembled as shown in FIGURES 6 and 7, it appears as the normal hand tool customarily observed.

In order to reverse the saw blade, it is necessary to loosen the wing nut 46 to the point where the blade 10 may be withdrawn. This means that in releasing the assembly, the spring 43 bears against the under surface of the stud plate 51 so as to lift the stud 52 out of engagement through the hole 17 in the saw blade. When the blade has been removed it can be reinserted in the reverse position with the teeth upward. When this has been done the wing nut can again be tightened so that the stud 52 penetrates the hole 17 of the blade in this position.

It will be observed that all of the objects and advantages heretofore listed for this invention are obtained by the structure disclosed herein, as well as numerous others which will readily occur to those skilled in this art.

I claim:

1. A reversible blade coping saw comprising in combination a standard saw blade having a pivot hole and an end slot at the butt end thereof substantially in line with the longitudinal axis of said blade, a symmetrical handle for said blade having a longitudinal slot in the top portion thereof for receiving said blade, an adjustable pivot bolt passing through said top portion of said handle and the pivot hole in said saw blade permitting said blade to pivot in said slot through an arc of at least 180°, and stud means on said handle cooperating with said pivot bolt and the end slot of said blade for securing the blade in a predetermined pivoted position.

2. A reversible blade coping saw comprising in combination a standard saw blade having a hole and an end slot aligned at the butt end thereof, a symmetrical handle for said blade having a longitudinal slot in the top portion thereof for receiving said blade, an adjustable pivot bolt passing through said top portion of said handle and the hole in said saw blade permitting said blade to pivot in said handle slot through an arc of at least 180°, and stud plate means on said handle cooperating with said pivot bolt and the end slot of said blade for securing the blade in a predetermined pivoted position.

3. A reversible blade coping saw comprising in combination a standard saw blade having a hole and an end slot aligned at the butt end thereof, a symmetrical handle for said blade having a longitudinal slot in the top portion thereof for receiving said blade, said handle also having four spaced transverse holes with only the pivot hole passing entirely therethrough and the other three ending shortly after passing through one side and said handle slot, an adjustable pivot bolt passing through the pivot hole in said top portion of said handle and the hole in said saw blade permitting said blade to pivot in said handle slot, and stud plate means retained on said pivot bolt having depending studs registering with each of the three holes on the side of said handle one stud of which cooperates to engage and pass through the end slot of said blade for securing the blade in a pivoted position.

4. A reversible blade coping saw comprising in combination a standard saw blade having a hole and an end slot aligned at the butt end thereof, a symmetrical handle for said blade having a longitudinal slot in the top portion thereof for receiving said blade, said handle also having four spaced transverse holes with only the pivot hole passing entirely therethrough and the other three ending shortly after passing through one side and said handle slot, an adjustable pivot bolt passing through the pivot hole in said top portion of said handle and the hole in said saw blade permitting said blade to pivot in said handle slot, stud plate means retained on said pivot bolt having depending studs registering with each of the three holes on said handle one stud of which cooperates with said pivot bolt and the end slot of said blade for securing the blade in a pivoted position, and quick means for locking and unlocking said blade in the pivoted adjusted position.

References Cited in the file of this patent

UNITED STATES PATENTS

| | | |
|---|---|---|
| 827,426 | Daniels | July 31, 1906 |
| 1,151,078 | Young | Aug. 24, 1915 |
| 1,638,749 | Santoyo | Aug. 9, 1927 |
| 2,747,631 | Behlefeldt | May 29, 1956 |
| 2,762,407 | McCord | Sept. 11, 1956 |

FOREIGN PATENTS

| | | |
|---|---|---|
| 137,638 | Austria | May 25, 1934 |